US008393067B2

(12) United States Patent
Kawamata

(10) Patent No.: US 8,393,067 B2
(45) Date of Patent: Mar. 12, 2013

(54) CONNECTION DEVICE FOR CONNECTION BETWEEN PIPE AND CONNECTION MEMBER

(75) Inventor: Yasuji Kawamata, Oyama (JP)

(73) Assignee: Showa Denko K.K., Tokyo (JP)

( * ) Notice: Subject to any disclaimer, the term of this patent is extended or adjusted under 35 U.S.C. 154(b) by 429 days.

(21) Appl. No.: 12/679,861

(22) PCT Filed: Sep. 24, 2008

(86) PCT No.: PCT/JP2008/067178
§ 371 (c)(1),
(2), (4) Date: Mar. 24, 2010

(87) PCT Pub. No.: WO2009/041427
PCT Pub. Date: Apr. 2, 2009

(65) Prior Publication Data
US 2010/0193123 A1 Aug. 5, 2010

(30) Foreign Application Priority Data
Sep. 25, 2007 (JP) ................. 2007-246955

(51) Int. Cl.
B21D 39/00 (2006.01)
B29C 65/00 (2006.01)
(52) U.S. Cl. ......................................... 29/507; 156/293
(58) Field of Classification Search ................... 29/507, 29/506, 505, 522.1, 523.1, 523, 524, 428, 29/890.044, 890.043; 156/293, 423; 403/230
See application file for complete search history.

(56) References Cited

FOREIGN PATENT DOCUMENTS

| JP | 49-3406 | B | 1/1974 |
| JP | 51-133170 | A | 11/1976 |
| JP | 2-13129 | U | 1/1990 |
| JP | 4-8818 | A | 1/1992 |
| JP | 06-106268 | A | 4/1994 |
| JP | 11-36859 | A | 2/1999 |
| JP | 11-47855 | A | 2/1999 |

OTHER PUBLICATIONS

Japanese Office Action dated May 1, 2012, issued in corresponding Japanese Patent Application No. 2007-246955, (English translation, 4 pages).
International Search Report of PCT/JP2008/067178, mailing date of Dec. 22, 2008.

Primary Examiner — John C Hong
(74) Attorney, Agent, or Firm — Westerman, Hattori, Daniels & Adrian, LLP

(57) ABSTRACT

A connecting device 30 is provided with a die 1 divided into a plurality of die segments 2 centering around a wedge hole portion 11 in a circumferential direction, and a mandrel 20. Each die segment 2 of the die 1 is moved radially outward of the pipe 40 by a mandrel 20 to expand an expansion target portion 41 of the pipe 40. The die segment 2 is equipped with apiece 3 having a first pressing protruded portion 4 for pressing one of two predetermined portions 41b and 41b of the pipe 40, a die segment main body 6 having a second pressing protruded portion 7 for pressing the other portion 41b, and connection means 15 for connecting the piece 3 and the die segment main body 6 in a detachable manner.

16 Claims, 8 Drawing Sheets

CONNECTION DEVICE FOR CONNECTION BETWEEN PIPE AND CONNECTION MEMBER

TECHNICAL FIELD

The present invention relates to a connecting device and a connecting method for connecting a member-to-be-connected, such as a flange, to a pipe.

BACKGROUND ART

Conventionally, examples of connecting methods for connecting a member-to-be-connected, such as a flange, to a pipe includes the following method.

A pipe is inserted into an insertion hole formed in a member-to-be-connected, and an expanding die is placed in a hollow portion of the pipe. This die has a wedge hole portion and is divided into a plurality of die segments in the circumferential direction thereof centering around the wedge hole portion. Next, an expanding mandrel is inserted into the wedge hole portion of the die to thereby move each die segment of the die in the radially outward direction of the pipe. With this, among the inserted portion of the pipe inserted in the insertion hole and both axially adjacent portions of the inserted portion, at least both the axially adjacent portions are enlarged in diameter (i.e., radially expanded) to thereby connect the member-to-be-connected to the pipe. This connecting method is also called a ridge lock method (see, for example, Patent Documents 1 to 3).

According to this connecting method, both the axially adjacent portions of the inserted portion of the pipe are locally pressed from the inside of the pipe, forming diameter enlarged tubular portions outwardly expanded at both the axially adjacent portions. The member-to-be-connected is connected to the pipe in a state in which the member-to-be-connected is clamped by and between these two diameter enlarged tubular portions. With this, the joint strength of the member-to-be-connected with respect to the pipe axial direction is enhanced.

Each die segment of the die is integrally provided with two pressing protruded portions for forming the two diameter enlarged tubular portions on the outer periphery at a distance in the axial direction of the die (i.e., in the axial direction of the pipe).

Patent Document 1: Japanese Unexamined Laid-opened Patent Application Publication No. H11-36859
Patent Document 2: Japanese Unexamined Laid-opened Patent Application Publication No. H11-47855
Patent Document 3: Japanese Unexamined Laid-opened Patent Application Publication No. H4-8818 (page 2, FIG. 8)

DISCLOSURE OF THE INVENTION

Problems to be Solved by the Invention

In the aforementioned die for use in conventional connecting method, the distance between the two pressing protruded portions are set according to the thickness of the member-to-be-connected. Therefore, when connecting a plurality of members-to-be-connected with different thicknesses, it is required to prepare a plurality dies each having two pressing protruded portions with a distance of a corresponding thicknesses of each member-to-be-connected. For this reason, there was a disadvantage that the purchase cost for the dies would be high.

The preferred embodiments of the present invention have been developed in view of the aforementioned problems and/or other problems in the related art. The preferred embodiments of the present invention can significantly improve upon existing methods and/or apparatuses.

The present invention was made in view of the aforementioned technical background, and its purpose is to provide a highly versatile connecting device for connecting a pipe and a member-to-be-connected, which is capable of connecting a plurality of members-to-be-connected different in thicknesses and a connecting method using the connecting device.

Other objects and advantages of the present invention will be apparent from the following preferred embodiments.

Means for Solving the Problems

The present invention has the following means.

[1] A connecting device for connecting a member-to-be-connected to a pipe by expanding both adjacent portions of the pipe axially adjacent to an inserted portion of the pipe inserted in an insertion hole formed in the member-to-be-connected in a state in which the pipe is inserted in the insertion hole, comprising:

a die to be disposed in a hollow portion of the pipe and divided into a plurality of die segments centering around a wedge hole portion in a circumferential direction; and a mandrel to be inserted in the wedge hole portion of the die to move each die segment of the die in a radially outward direction of the pipe, wherein the die segment comprises a piece having a first pressing protruded portion which presses one of both the adjacent portions of the pipe, a die segment main body having a second pressing protruded portion which presses the other adjacent portion and comes in contact with the mandrel, and connection means which detachably connects the piece and the die segment main body.

[2] The connecting device as recited in the aforementioned Item 1, wherein the die segment main body is integrally provided with an extended portion extended toward the piece, wherein a surface of the extended portion located at a side of the wedge hole portion comes into contact with the mandrel, and wherein the piece is disposed on a surface of the extended portion opposite to the wedge hole portion.

[3] The connecting device as recited in the aforementioned Item 1, wherein a surface of the piece located at a side of the wedge hole portion comes into contact with the mandrel.

[4] The connecting device as recited in any one of the aforementioned Items 1 to 3, wherein an engaging stepped portion and an engaging protruded portion, which are engageable with each other, are formed on opposing surfaces of the die segment main body and the piece.

[5] The connecting device as recited in the aforementioned Item 1, wherein the die segment is further equipped with at least one spacer disposed between the piece and the die segment main body, and wherein the connection means detachably connects the piece and the die segment main body via the spacer.

[6] The connecting device as recited in the aforementioned Item 5, wherein the die segment main body is integrally provided with an extended portion extended toward the piece, wherein a surface of the extended portion located at a side of the wedge hole portion comes into contact with the mandrel, and wherein the piece and the spacer are disposed on a surface of the extended portion opposite to the wedge hole portion.

[7] The connecting device as recited in the aforementioned Item 5, wherein a surface of the spacer located at the side of the wedge hole portion comes into contact with the mandrel.

[8] The connecting device as recited in the aforementioned Item 7, wherein an engaging stepped portion and an engaging protruded portion, which are engageable with each other, are formed on opposing surfaces of the die segment main body and the spacer.

[9] The connecting device as recited in the aforementioned Item 7 or 8, wherein an engaging stepped portion and an engaging protruded portion, which are engageable with each other, are formed on opposing surfaces of the spacer and the piece.

[10] The connecting device as recited in the aforementioned Item 9, wherein the engaging stepped portion and the engaging protruded portion are formed such that, in a state in which the engaging stepped portion and the engaging protruded portion are engaged with each other, a position of a tip end of the engaging stepped portion is located at the same position as an apex portion of the first pressing protruded portion of the piece in an axial direction of the die, or is located at a position opposite to the spacer with respect to the apex portion.

[11] The connecting device as recited in the aforementioned Items 7 or 8, wherein the spacer is integrally provided with an extended portion extended toward the piece, wherein a surface of the extended portion located at side of the wedge hole portion comes into contact with the mandrel, and wherein the piece is disposed on a surface of the extended portion opposite to the wedge hole portion.

[12] The connecting device as recited in any one of the aforementioned Items 5 to 11, wherein the member-to-be-connected includes a first member-to-be-connected and a second member-to-be-connected to be disposed with a distance in an axial direction of the pipe with the pipe inserted in the insertion hole of the member-to-be-connected, and wherein the spacer has a third pressing protruded portion which presses a portion of the pipe corresponding to a gap between the first member-to-be-connected and the second members-to-be-connected.

[13] A connecting method for connecting a pipe and a member-to-be-connected using a connecting device comprising a die divided into a plurality of die segments centering around a wedge portion in a circumferential direction, and a mandrel, wherein the mandrel is inserted in the wedge hole portion of the die arranged in a hollow portion of the pipe to expand both axially adjacent portions of the pipe adjacent to an inserted portion of the pipe inserted in an insertion hole formed in the member-to-be-connected, to thereby connect the member-to-be-connected to the pipe, wherein the connecting device as recited in any one of the aforementioned Items 1 to 12 is used as the connecting device.

Effects of the Invention

The present invention has the following effects.

In the invention [1], the die segment of the die of the connecting device is provided with the piece having the first pressing protruded portion, the die segment main body having the second pressing protruded portion, and the connection means. Thus, the distance between the first pressing protruded portion of the piece and the second pressing protruded portion of the die segment main body can be set so as to correspond to the thickness of the member-to-be-connected. Therefore, the present invention can provide a connecting device high in versatility.

In the invention [2], the die segment main body is integrally provided with an extended portion extended toward the piece, and a surface of the extended portion located at a side of the wedge hole portion comes into contact with the mandrel. Therefore, the surface of the extended portion of the die segment main body located at the side of the wedge hole portion receives a driving force in the radially outward direction of the pipe from the mandrel at the time of the expansion work. The piece is arranged on a surface of the extended portion opposite to the wedge hole portion, which allows assured application of the driving force to the first pressing protruded portion of the piece in the radially outward direction of the pipe. This enables assured expansion of the predetermined portions of the pipe.

In the invention [3], a surface of the piece located at a side of the wedge hole portion comes into contact with the mandrel. Therefore, the surface receives a driving force in the radially outward direction of the pipe from the mandrel at the time of the expansion work. This allows assured application of the driving force in the radially outward direction of the pipe to the first pressing protruded portion of the piece. Thus, the predetermined portions of the pipe can be expanded assuredly.

In the invention [4], the engaging stepped portion and the engaging protruded portion, which are engageable with each other, are formed on opposing surfaces of the die segment main body and the piece. This allows easy positioning of the piece with respect to the die segment main body.

In the invention [5], the die segment is further equipped with at least one spacer disposed between the piece and the die segment main body. Therefore, by arranging at least one spacer between the piece and the die segment main body depending on the thickness of the member-to-be-connected, the distance between the first pressing protruded portion and the second pressing protruded portion can be changed easily. Accordingly, with this invention, the versatility of the connecting device can be further enhanced.

In the invention [6], the die segment main body is integrally provided with an extended portion extended toward the piece, and a surface of the extended portion located at a side of the wedge hole portion comes into contact with the mandrel. Therefore, the surface of the extended portion of the die segment main body located at the side of the wedge hole portion receives the driving force in the radially outward direction of the pipe from the mandrel at the time of the expansion work. Furthermore, the piece and the spacer are disposed on a surface of the extended portion opposite to the wedge hole portion, which allows assured application of the driving force in the radially outward direction of the pipe to the first pressing protruded portion of the piece. Thus, the predetermined positions of the pipe can be expanded assuredly.

In the invention [7], the surface of the spacer located at the side of the wedge hole portion comes into contact with the mandrel. Therefore, the surface receives the driving force in the radially outward direction of the pipe at the time of the expansion work. This allows assured application of the driving force in the radially outward direction of the pipe to the spacer.

In the invention [8], the engaging stepped portion and the engaging protruded portion, which are engageable with each other, are formed on opposing surfaces of the die segment main body and the spacer, which allows easy positioning of the spacer with respect to the die segment main body.

In the invention [9], the engaging stepped portion and the engaging protruded portion, which are engageable with each other, are formed on opposing surfaces of the spacer and the piece, which allows easy positioning of the piece with respect to the spacer.

In the invention [10], the engaging stepped portion and the engaging protruded portion are formed such that, in a state in which the engaging stepped portion and the engaging protruded portion are engaged with each other, a position of the tip end of the engaging stepped portion is located at the same position as the apex portion of the first pressing protruded portion of the piece in an axial direction of the die, or is located at a position opposite to the spacer with respect to the apex portion. This allows assured application of the driving force in the radially outward direction of the pipe from the spacer to the first pressing protruded portion of the piece. Furthermore, at the time of the expansion work, the load applied to the first pressing protruded portion of the piece from the pipe can be received by the engaging stepped portion assuredly.

In the invention [11], the spacer is integrally provided with an extended portion extended toward the piece, and a surface of the extended portion located at a side of the wedge hole portion comes into contact with the mandrel. Therefore, the surface of the extended portion of the spacer located at the side of the wedge hole portion receives the driving force in the radially outward direction of the pipe from the mandrel at the time of the expansion work. The piece is disposed on the surface of the extended portion opposite to the wedge hole portion, which allows assured application of the driving force in the radially outward direction of the pipe to the first pressing protruded portion of the piece. Thus, the predetermined portions of the pipe can be expanded assuredly.

In the invention [12], the spacer has a third pressing protruded portion which presses a portion of the pipe corresponding to a gap between the first member-to-be-connected and the second members-to-be-connected. Therefore, in collectively connecting the first member-to-be-connected and the second member-to-be-connected, the portion of the pipe corresponding to the gap between the first member-to-be-connected and the second member-to-be-connected can be expanded.

In the invention [13], the distance between the first pressing protruded portion and the second pressing protruded portion of the die segment can be set depending on the thickness of the member-to-be-connected. Therefore, the member-to-be-connected can be assuredly connected to the pipe.

DESCRIPTION OF THE REFERENCE NUMERALS

Figure 1:
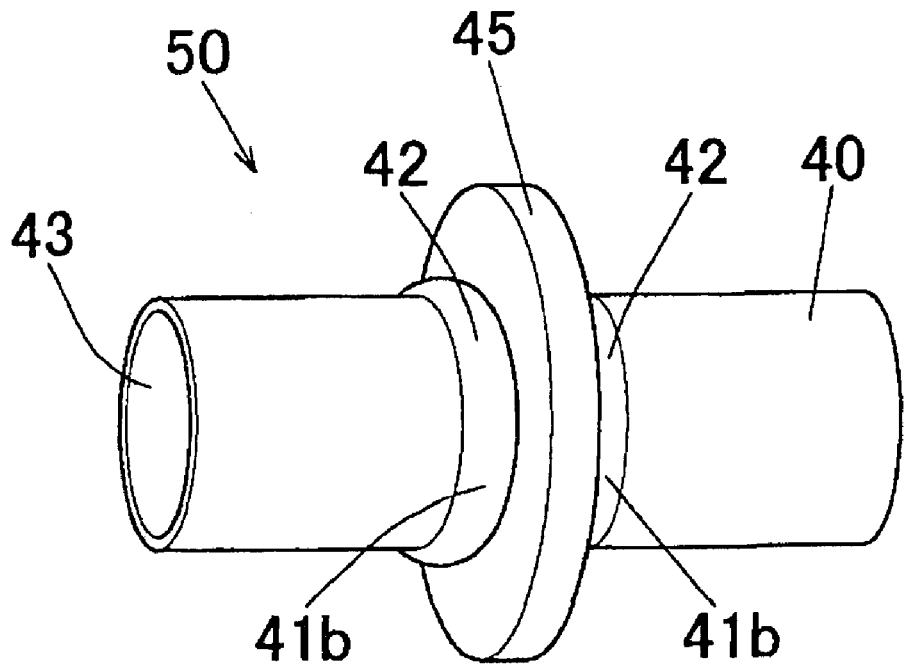
FIG. 1 is a perspective view showing a connection structure produced by connecting a member-to-be-connected to a pipe with a connecting device according to a first embodiment of the present invention.

1: die
2: die segment
3: piece
4: first pressing protruded portion
6: die segment main body
7: second pressing protruded portion
8: extended portion of the die segment main body
9: spacer
9c: third pressing protruded portion
10: extended portion of the spacer
11: wedge hole portion
15, 15A, 15B: connection bolt (connection means)
20: mandrel
21: wedge portion
30: connecting device
40: pipe
41: expansion target portion
   41a: inserted portion
   41b: adjacent portion
42: diameter enlarged tubular portion
43: hollow portion
45: member-to-be-connected
46: insertion hole

BEST MODE FOR CARRYING OUT THE INVENTION

Next, several embodiments of the present invention will be explained with reference to drawings.

First Embodiment

FIGS. 1 to 6 are explanatory drawings of a connecting device and a connecting method according to a first embodiment of the present invention. "30" denotes a connecting device of the first embodiment.

Figure 2:
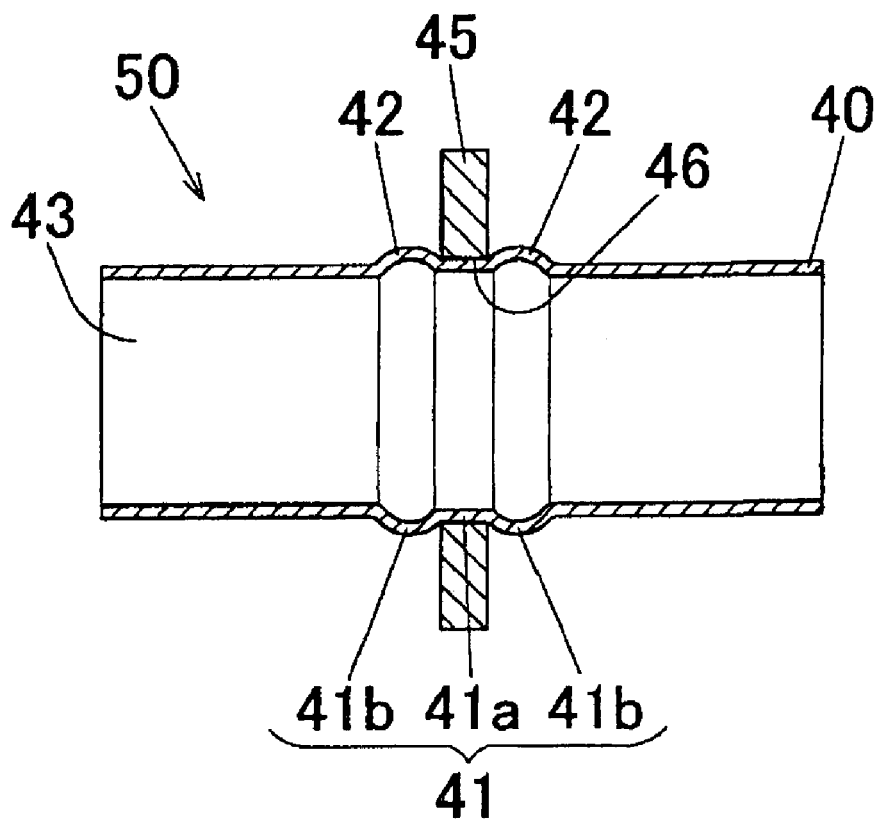
FIG. 2 is a cross-sectional view of the connection structure.
Figure 3:
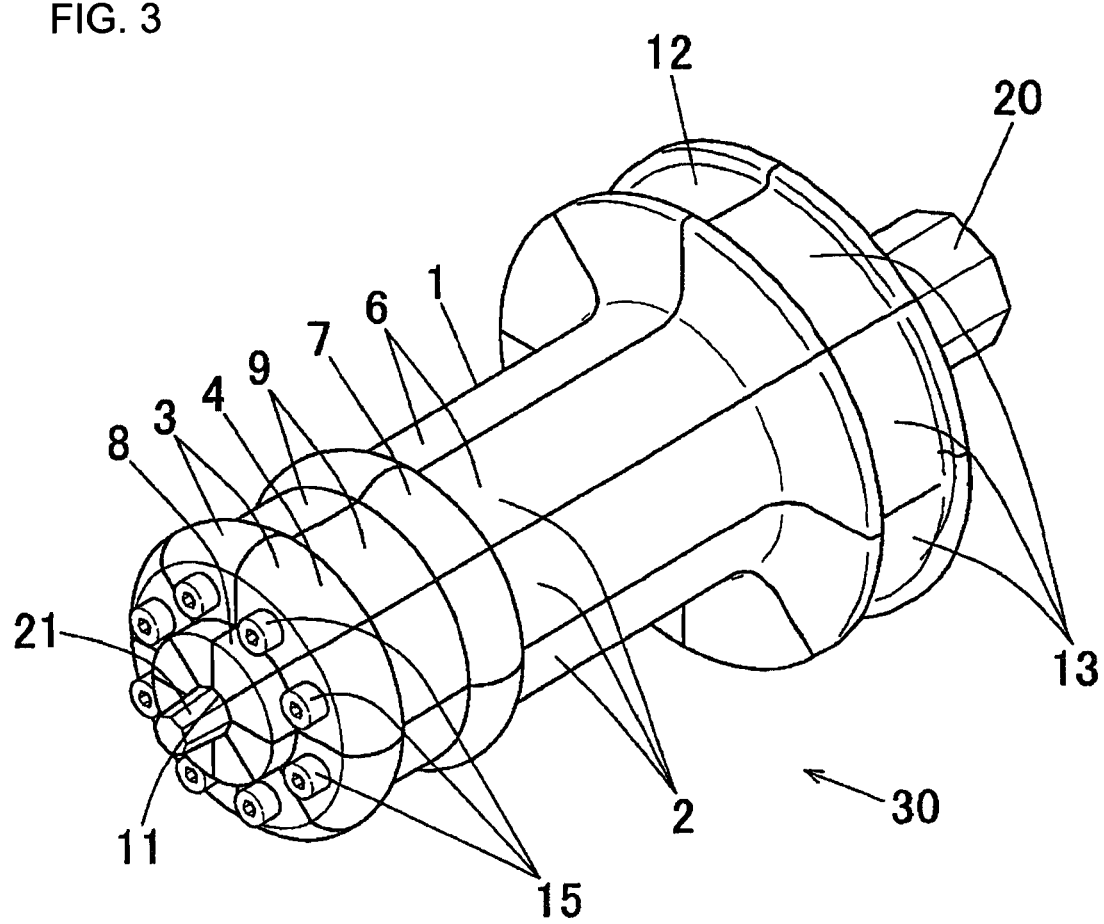
FIG. 3 is a perspective view of the connection device.

In FIGS. 1 and 2, "50" denotes a connection structure produced by connecting a member-to-be-connected 45 to a pipe 40 with the connecting device 30 of the first embodiment.

The pipe 40 is a member to be used as a parts of an automobile, such as, e.g., a steering support beam, a steering column holder, a muffler, a frame, a propeller shaft, or a suspension arm, or a member to be used as, e.g., piping. However, the present invention does not limit the pipe 40 to a member used for such purposes.

The pipe 40 is straight and has a round in cross-section. The pipe 40 has a hollow portion 43 round in cross-section and extending in the axial direction (i.e., in the longitudinal direction thereof). Furthermore, the pipe 40 is set to be constant in inner diameter and wall thickness in the axial direction of the pipe 40.

The pipe 40 is made of an elastically deformable and plastically deformable material, and is, for example, a metal member, more specifically an aluminum (including its alloy, hereinafter the same in this disclosure). In the present invention, however, the material of the pipe 40 is not limited to aluminum, and can be, for example, metal, such as, e.g., iron, steel, or copper, or plastic. Furthermore, the pipe 40 can be an extruded member or a drawn member, or any other member produced by any other method.

The member-to-be-connected 45 is a member to be used as, for example, a flange to be attached to another member (not illustrated). Furthermore, the member-to-be-connected 45 is a plate-shaped member, more specifically a circular ring-shaped member. The peripheral edge portion of the member-to-be-connected 45 is provided with a fastening member insertion hole (not illustrated) such as a bolt insertion hole or a connection piece. In the present invention, however, the member-to-be-connected 45 is not limited to a member to be used as a flange, and can be a member having a bracket or a stay, or any other member used for another purpose.

This member-to-be-connected 45 is made of an elastically deformable material, and is, for example, a metal member, more specifically an aluminum member. In the present invention, however, the material of the member-to-be-connected 45 is not limited to aluminum, and can be metal, such as, e.g., iron, steel, or copper, or plastic. Furthermore, the member-to-be-connected 45 can be an extruded member, a drawn member, or a rolled member, or can be a die cast member or other member produced by other method.

The member-to-be-connected 45 has, at its central portion, an insertion hole 46 for inserting the pipe 40. The insertion hole 46 has a cross-sectional shape corresponding to the cross-sectional shape of the pipe 40, i.e., a round shape.

The length of the pipe 40 is, for example, 50 to 2,000 mm. The inner diameter is, for example, 20 to 100 mm. The wall thickness of the pipe 40 is, for example, 0.5 to 5 mm.

The thickness of the member-to-be-connected 45 is, for example, 5 to 50 mm. The diameter of the member-to-be-connected 45 is, for example, 30 to 300 mm. The diameter of the insertion hole 46 of the member-to-be-connected 45 is set to be larger than the diameter of the pipe 40 by, for example, 0.1 to 1 mm in a state before being expanded.

In this invention, however, it is not limited that the size of each portion of the pipe 40 and that of the member-to-be-connected 45 fall within the aforementioned ranges, and can be variously set depending on the intended use and/or application of the connection structure 50.

As shown in FIGS. 1 and 2, in this connection structure 50, at least both adjacent portions 41b and 41b of the inserted portion 41a of the pipe 40 inserted in the insertion hole 46 among the expansion target portions 41 including the inserted portion 41a and the adjacent portions 41b and 41b are expanded in a state in which the pipe 40 is inserted in the insertion hole 46 of the member-to-be-connected 45, whereby the member-to-be-connected 45 is connected to the pipe 40. In the first embodiment, all of the expansion target portions 41 of the pipe 40 are expanded.

The preset invention, however, does not limit that all of the expansion target portions 41 of the pipe 40 are expanded, and allows only the axially both adjacent portions 41b and 41b of the inserted portion 41a of the pipe 40 inserted in the insertion hole 46 to be expanded.

In this connection structure 50, two diameter enlarged tubular portions (protruded portions) 42 and 42 protruded locally outward of the pipe 40 are formed at the axially both adjacent portions 41b and 41b of the inserted portion 41a of the pipe 40 inserted in the insertion hole 46. The member-to-be-connected 45 is connected to the pipe 40 with the member-to-be-connected 45 clamped by and between both the diameter enlarged tubular portions 42 and 42.

The diameter enlarged amount (i.e., expansion amount) of the diameter enlarged tubular portion 42 is, for example, 0.5 to 10 mm. Further, the width of the diameter enlarged tubular portion 42 is, for example, 3 to 30 mm. In the present invention, however, it is not limited that the diameter enlarged mount and the width of the diameter enlarged tubular portion 42 fall within the aforementioned ranges.

Next, the connecting device 30 of the first embodiment will be explained with reference to FIGS. 3 to 6.

This connecting device 30 is equipped with, e.g., an expansion die 1 and an expansion mandrel 20.

The die 1 is a cylindrical member. At the axial one end portion of the die 1, a circular plate-shaped or columnar-shaped supporting portion 12 for supporting the die 1 is integrally provided.

The die 1 has a wedge hole portion 11 penetrating the die 1 and the supporting portion 12 in the axial direction in the central portion. The wedge hole portion 11 is formed into a conical or pyramid shape. In the first embodiment, the wedge hole 11 is formed into a pyramid shape, more specifically a regular octagonal pyramid. Therefore, the cross-sectional shape of the wedge hole 11 is a regular octagonal shape.

Furthermore, the die 1 is divided equally into a plurality of die segments 2 in the circumferential direction centering around the wedge hole portion 11. Corresponding to this division, the supporting portion 12 is also divided equally into a plurality of supporting portion segments 13 in the circumferential direction centering around the wedge hole portion 11. In this first embodiment, the divisional number of the die 1 and that of the supporting portion 12 is both eight. The die segment 2 of the die 1 and the supporting portion segment 13 of the supporting portion 12 are integrally formed with each other.

The mandrel 20 has a wedge portion 21 corresponding to the wedge hole portion 11 of the die 1. This wedge portion 21 is integrally formed with one end portion of the mandrel 20 in a tapered manner. The wedge portion 21 is formed into a conical or pyramid shape. In the first embodiment, it is formed into a regular octagonal pyramid shape. The wedge portion 21 is made of, e.g., tool steel or cemented carbide. The tapered angle of the wedge portion 21 is set to be equal to the tapered angle of the wedge hole portion 11 of the die 1, and set to be, e.g., 1 to 30° (degrees). In the present invention, however, it is not limited that the tapered angle of the wedge portion 21 and that of the wedge hole portion 11 fall within the aforementioned ranges.

At the other end portion of the mandrel 20, a pushing means 25 for pressing the mandrel 20 in the direction of inserting the wedge portion 21 of the mandrel 20 in the wedge hole portion 11 of the die 1 is connected. As the pushing means 25, for example, a hydraulic cylinder can be used.

Figure 4:
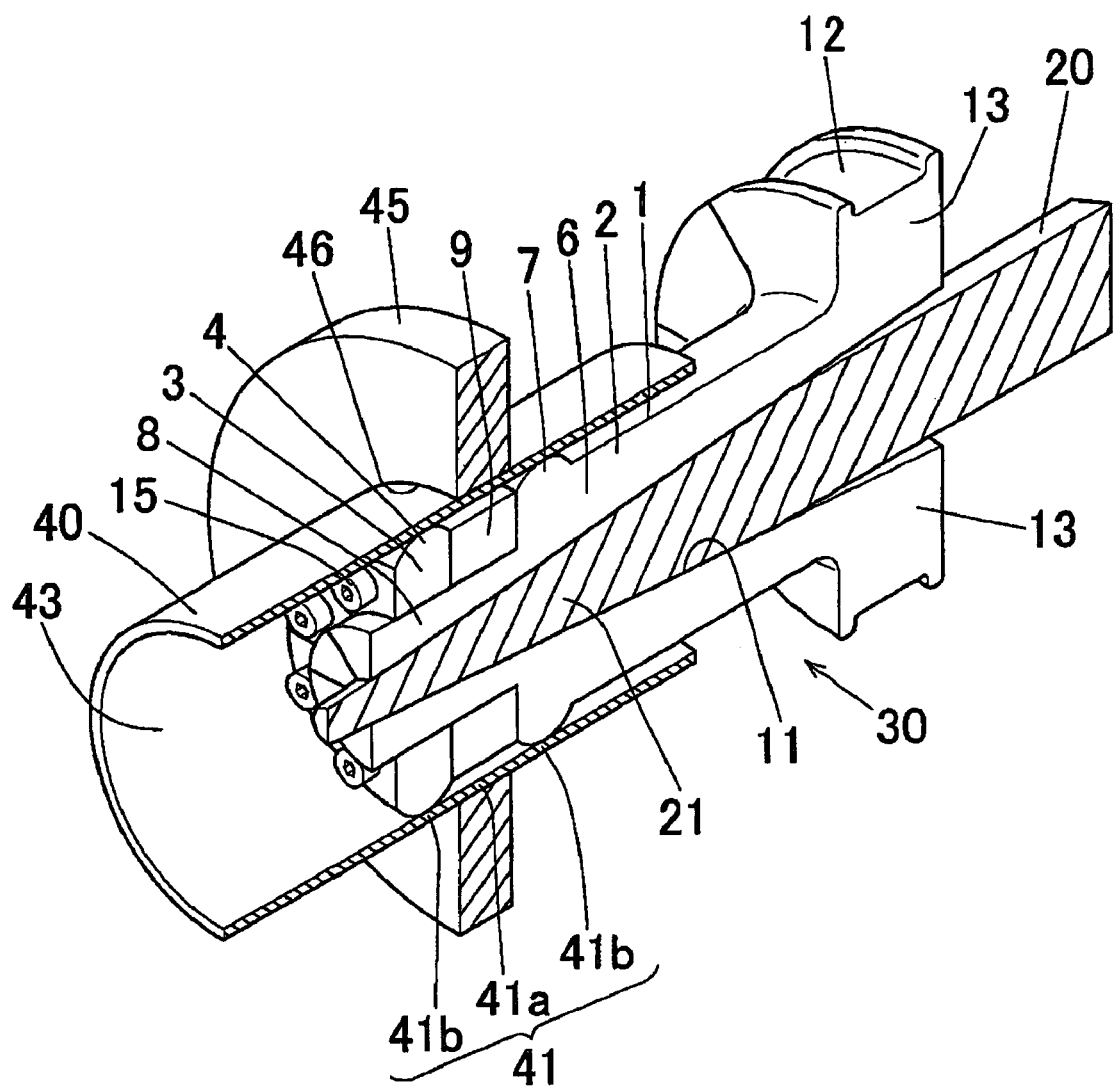
FIG. 4 is a cross-sectional perspective view showing a state before connecting a member-to-be-connected to a pipe with the connecting device.
Figure 5:
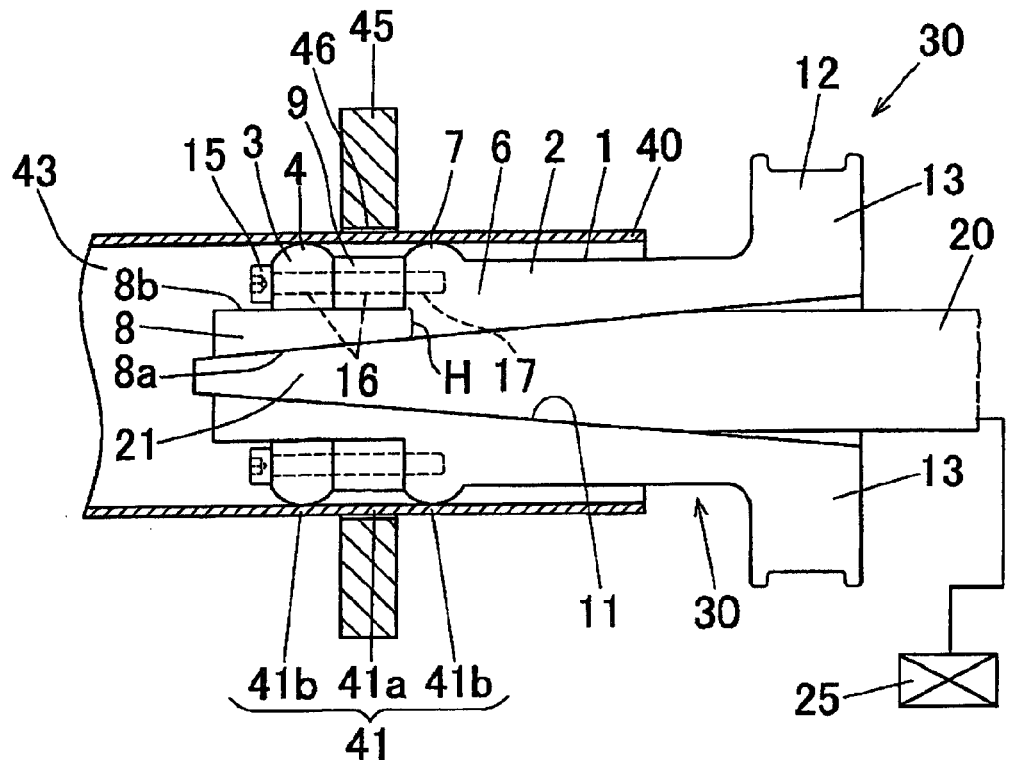
FIG. 5 is a cross-sectional view showing a state before connecting a member-to-be-connected to a pipe with the connecting device.
Figure 6:
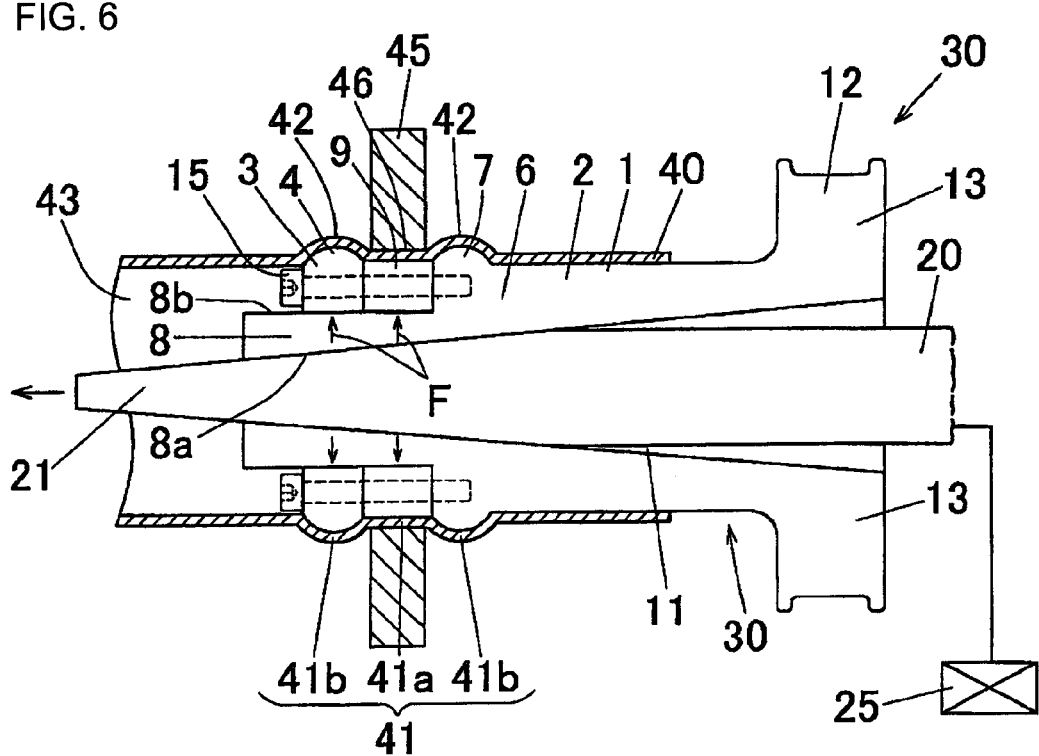
FIG. 6 is a cross-sectional view showing a state in the middle of connecting a member-to-be-connected to a pipe with the connecting device.

As shown in FIGS. 4 to 6, the mandrel 20 is configured to move each die segment 2 of the die 1 radially outward of the pipe 40 by inserting the wedge portion 21 of the mandrel 20 in the wedge hole portion 11 of the die 1 disposed in the hollow portion 43 of the pipe 40.

Each die segment 2 of the die 1 is moved radially outward of the pipe 40 by the wedge portion 21 of the mandrel 20 to expand the expansion target portion 41 of the pipe 40. These die segments 2 are the same in structure.

A first pressing protruded portion 4 and a second pressing protruded portion 7 are formed on the external peripheral surface of each die segment 2 (i.e., the external surface of each die segment 2 facing the pipe 40) with a distance in the axial direction of the die 1 (i.e., the axial direction of the pipe 40).

The first pressing protruded portion 4 is configured to press one 41b of the axially both adjacent portions 41b and 41b of the inserted portion 41a of the pipe inserted in the insertion hole 46 locally outward of the pipe 40, and the second pressing protruded portion 7 is configured to press the other portion 41b locally outward of the pipe 40. The first pressing protruded portion 4 and the second pressing protruded portion 7 are both extended in the circumferential direction of the die 1 and protruded in an arc cross-sectional manner. The first pressing protruded portion 4 and the second pressing protruded portion 7 are configured to press both the axially adjacent portions 41b and 41b of the inserted portion 41a of the pipe 40 inserted in the insertion hole 46 to plastically deform both the adjacent portions 41b and 41b to thereby form the diameter enlarged tubular portions 42 and 42 having an arc cross-sectional shape at both the adjacent portions 41b and 41b (see FIG. 6).

The protruded height of the first pressing protruded portion 4 and that of the second pressing protruded portion 7 are each set to, for example, 0.5 to 10 mm. The width of the first pressing protruded portion 4 and that of the second pressing protruded portion 7 are each set to, for example, 2 to 20 mm. In the present invention, however, it is not limited that the protruded height and the width each fall within the aforementioned ranges.

Furthermore, the die segment 2 is divided into a piece 3 having the first pressing protruded portion 4 and a die segment main body 6 having the second pressing protruded portion 7, and further provided with at least one spacer 9 and a connection bolt 15 as a connection means. In this first embodiment, one spacer 9 is used.

The surface of the die segment main body 6 located at the side of the wedge hole portion 11 constitutes a part of the inner peripheral surface of the wedge hole portion 11, and comes into contact with the mandrel 20 (specifically, the external peripheral surface of the wedge portion 21 of the mandrel 20) inserted in the wedge hole portion 11 at the time of the expansion work.

The spacer 9 is disposed between the piece 3 and the die segment main body 6 to keep the distance between the first pressing protruded portion 4 of the piece 3 and the second pressing protruded portion 7 of the die segment main body 6 to be a predetermined distance. Specifically, it keeps the distance between the first pressing protruded portion 4 and the second pressing protruded portion 7 at a distance corresponding to the thickness of the member-to-be-connected 45. The spacer 9 is configured to press the inserted portion 41a of the pipe 40 inserted in the insertion hole 46 outward of the pipe 40 at the time of the expansion work, to thereby expand the inserted portion 41a.

The connection bolt 15 detachably connects the piece 3 and the die segment main body 6 via the spacer 9. The connection bolt 15 is, for example, a hexagon socket head cap screw.

A large load will be applied to the piece 3 and the die segment main body 6 from the pipe 40 at the time of the expansion work, which tends to cause abrasion thereof. For this reason, the piece 3 and the die segment main body 6 both have strength higher than that of the pipe 40, and are made of, for example, tool steel or cemented carbide, or have a surface covered with a rigid film.

The spacer 9 is not required to have as high strength and abrasion resistance as those of the piece 3 and die segment main body 6, and therefore is not always required to be a member made of tool steel or cemented carbide. The spacer 9 is made of normal steel.

The die segment main body 6 has an integrally formed extended portion 8 extended toward the piece 3. The surface 8a of the extended portion 8 positioned at the side of the wedge hole portion 11 is inclined at the same tapered angle as that of the inner peripheral surface of the wedge hole portion 11, and is flush with the inner peripheral surface of the wedge hole portion 11. Thus, the surface 8a is brought into contact with the mandrel 20 (more specifically, the external peripheral surface of the wedge portion 21 of the mandrel 20) inserted in the wedge hole portion 11 at the time of the expansion work to receive the driving force F in the radially outward direction of the pipe 40 (see FIG. 6). In FIG. 5, "H" denotes a thickness of the extended portion 8.

In the first embodiment, the piece 3 and the spacer 9 are not brought into contact with the wedge portion 21 of the mandrel 20 inserted in the wedge hole portion 11 at the time of the expansion work and arranged on the surface 8b of the extended portion 8 of the die segment main body 6 opposite to the wedge hole portion 11. This surface 8b is arranged in parallel to the central axis of the pipe 40.

Furthermore, as shown in FIG. 5, a bolt insertion holes 16 and 16 into which the connection bolt 15 is inserted are penetrated in the piece 3 and the spacer 9 in the longitudinal direction of the piece 3 and the spacer 9. Furthermore, in the surface of the die segment main body 6 facing the spacer 9, a threaded hole 17 into which the connection bolt 15 is threaded is provided.

In this die segment 2, in a state in which the piece 3 and the spacer 9 are disposed on the surface 8b of the extended portion 8 of the die segment main body 6 opposite to the wedge hole portion 11, the connection bolt 15 is inserted in the bolt insertion holes 16 and 16 of the piece 3 and the spacer 9, and the tip end portion of the connection bolt 15 is threaded into the threaded hole 17 of the die segment main body 6. Thus, the piece 3 and the die segment main body 6 are integrally connected with the connection bolt 15 via the spacer 9.

The piece 3 and the spacer 9 are arranged on the surface 8b of the extended portion 8 of the die segment main body 6 opposite to the wedge hole portion 11, and therefore will not come into contact with the wedge portion 21 of the mandrel 20 inserted in the wedge hole portion 11 at the time of the expansion work.

Furthermore, the die segment 2 is configured such that the piece 3, the die segment main body 6 and the spacer 9 can be separated with each other by releasing the engagement of the connection bolt 15 and the threaded hole 17.

Next, a method of connecting the member-to-be-connected 45 to the pipe 40 using the connecting device 30 according to the first embodiment will be explained as follows.

As shown in FIGS. 4 and 5, the pipe 40 is inserted in the insertion hole 46 of the member-to-be-connected 45 with a gap therebetween. Furthermore, the die 1 is inserted into the hollow portion 43 of the pipe 40 from the end opening thereof and disposed therein. In this state, the supporting portion 12 of the die 1 is positioned outside the pipe 40.

Next, the mandrel 20 is pressed in the axial direction thereof with the pushing means 25 to forcibly insert the wedge portion 21 of the mandrel 20 into the wedge hole portion 11 of the die 1. With this, as shown in FIG. 6, each die segment 2 of the die 1 is moved radially outward of the pipe 40 to thereby expand the expansion target portion 41.

With this expansion work, the expansion target portion 41 of the pipe 40 is plastically deformed so as to expand outward of the pipe 40 to be press-fitted to the inner peripheral surface of the insertion hole 46 of the member-to-be-connected 45, and the member-to-be-connected 45 is elastically deformed such that the inner diameter of the insertion hole 46 of the member-to-be-connected 45 increases radially outward thereof. The elastic deformation of the member-to-be-connected 45 causes accumulation of the elastic restoring force in the member-to-be-connected 45.

At the time of this expansion work, both axially adjacent portions 41b and 41b of the inserted portion 41a of the pipe 40 inserted in the insertion hole 46 are locally pressed outward of the pipe 40 by the first pressing protruded portion 4 and the second pressing protruded portion 7 of each die segment 2 of the die 1 to be expanded into an arc cross-sectional shape. Thus, a diameter enlarged tubular portions 42 and 42 each having an arc cross-sectional shape are formed at both the adjacent portions 41b and 41b.

Thereafter, the wedge portion 21 of the mandrel 20 is pulled out of the wedge hole portion 11 of the die 1. This causes the member-to-be-connected 45 to be press-fitted to the external peripheral surface of the pipe 40 by the elastic restoring force accumulated in the member-to-be-connected 45. Thus, the member-to-be-connected 45 is connected to the pipe 40. Thereafter, the die 1 is pulled out of the hollow portion 43 of the pipe 40.

Following the procedures mentioned above, the connection structure 50 shown in FIGS. 1 and 2 can be obtained.

In this connection structure 50, the member-to-be-connected 45 is connected to the pipe 40 with the member-to-be-connected 45 clamped by and between the two diameter enlarged tubular portions 42 and 42. Therefore, the join strength of the member-to-be-connected 45 with respect to the pipe axial direction is extremely high.

In this connecting device 30, in detaching the spacer 9 from the die segment 2, the engagement of the connection bolt 15 and the threaded hole 17 is released and the connection bolt 15 is pulled out of the threaded hole 17 and the bolt insertion holes 16 and 16. Thus, the spacer 9 can be detached from the die segment 2.

The connecting device 30 of the first embodiment has the following advantages.

The die segment 2 of the die 1 includes the piece 3 having the first pressing protruded portion 4, the die segment main body 6 having the second pressing protruded portion 7, at least one spacer 9, and the connection bolt 15. Thus, the distance between the first pressing protruded portion 4 of the piece 3 and the second pressing protruded portion 7 of the die segment main body 6 can be adjusted so as to correspond to the thickness of the member-to-be-connected 45. In detail, for example, at least one piece 3, die segment main bodies 6, and spacers 9 are prepared in such a manner that the distance between the first pressing protruded portion 4 and the second pressing protruded portion 7 can be changed variously. Then, the piece 3, the die segment main bodies 6, and one of the spacer 9 are selected from the aforementioned members so as to correspond to the thickness of the member-to-be-connected 45 and combined to form a die segment 2. This allows the distance between the first pressing protruded portion 4 and the second pressing protruded portion 7 to be set corresponding to the thickness of the member-to-be-connected 45. Therefore, this connecting device 30 is high in versatility.

Furthermore, the placement of the spacer 9 between the piece 3 and the die segment main body 6 depending on the thickness of the member-to-be-connected 45 allows easy adjustments of the distance between the first pressing protruded portion 4 and the second pressing protruded portion 7. Thus, this connecting device 30 is extremely excellent in versatility.

Furthermore, the extended portion 8 extended toward the piece 3 is integrally formed with the die segment main body 6, and the surface 8a of the extended portion 8 of the die segment main body 6 positioned at the side of the wedge hole portion 11 is brought into contact with the wedge portion 21 of the mandrel 20 (specifically, the external peripheral surface of the wedge portion 21) inserted in the wedge hole portion 11 at the time of the expansion work. Therefore, the surface 8a of the extended portion 8 of the die segment main body 6 positioned at the side of the wedge hole portion 11 receives a driving force F radially outward of the pipe 40 from the wedge portion 21 of the die segment main body (see FIG. 6). Further, the piece 3 and the spacer 9 are disposed on the surface 8b of the extended portion 8 opposite to the wedge hole portion 11, and therefore the driving force F directed radially outward of the pipe 40 can be assuredly applied to the first pressing protruded portion 4 of the piece 3. As a result, predetermined portions 41b of the pipe 40 can be expanded assuredly.

Furthermore, the connecting device 30 is equipped with the pushing means 25, which prevents tensile fracture of the mandrel 20.

Second Embodiment

Figure 7:
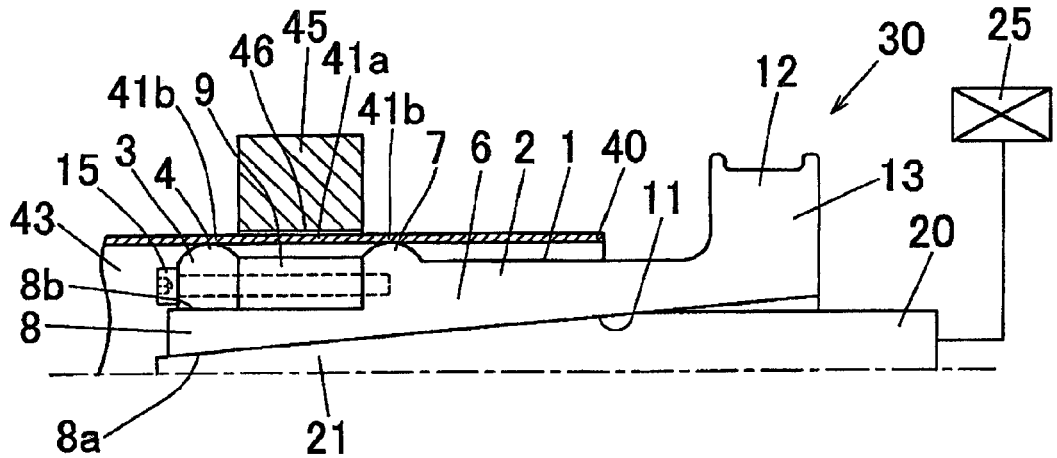
FIG. 7 is a half cross-sectional view showing a state before connecting a member-to-be-connected to a pipe with a connecting device according to a second embodiment of the present invention.

FIG. 7 is an explanatory view of a connecting device 30 of a second embodiment of the present invention. This connecting device 30 will be explained below, focusing on the points different from the first embodiment.

In the second embodiment, the thickness of the member-to-be-connected 45 is larger than that of the member-to-be-connected of the first embodiment. In this embodiment, one spacer 9 selected from a plurality of spacers 9, which corresponds to the thickness of the member-to-be-connected 45, is used. The length of this spacer 9 is set to be longer than that of the spacer used in the first embodiment.

The other structure of this connecting device 30 and the connecting method using this connecting device 30 are the same as those of the first embodiment.

Third Embodiment

Figure 8:
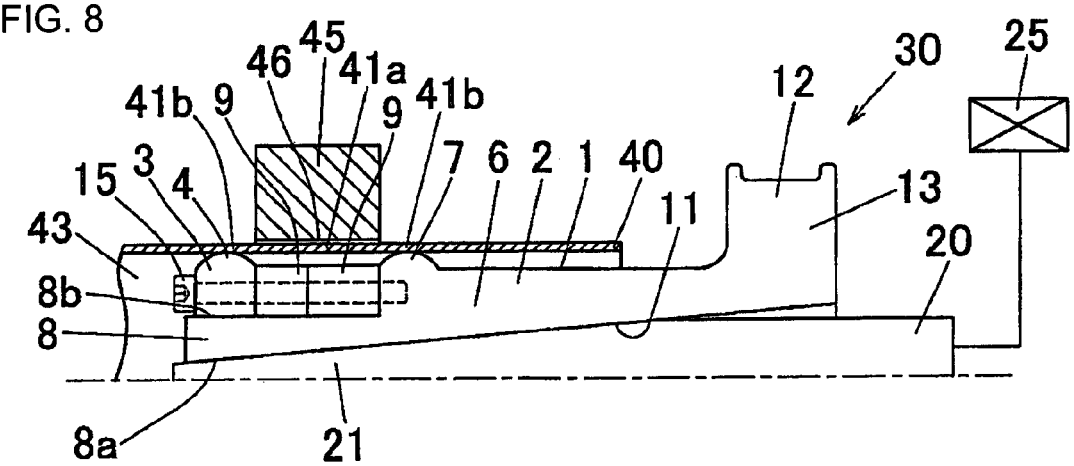
FIG. 8 is a half cross-sectional view showing a state before connecting a member-to-be-connected to a pipe with a connecting device according to a third embodiment of the present invention.

FIG. 8 is an explanatory view of a connecting device 30 of a third embodiment of the present invention. This connecting device 30 will be explained below, focusing on the points different from the first embodiment.

In this third embodiment, the thickness of the member-to-be-connected 45 is thicker than that of the member-to-be-connected 45 of the first embodiment. Furthermore, in this connecting device 30, a plurality of spacers 9 selected from a plurality of spacers so as to correspond to the thickness of the member-to-be-connected 45 are arranged in line in the axial direction. In the third embodiment, the number of spacers 9 is two.

The other structure of this connecting device 30 and the connecting method using the connecting device 30 are the same as those of the first embodiment.

In the present invention, the number of spacers 3 is not limited to two, and can be variously changed depending on the thickness of the member-to-be-connected 45.

As understood from the first to third embodiments, in this connecting device 30, changing of the length of the spacer 9 and/or the number of the spacers 9 depending on the thickness of the member-to-be-connected 45 allows easy changing of the distance between the first pressing protruded portion 4 and the second pressing protruded portion 7.

Fourth Embodiment

Figure 9:
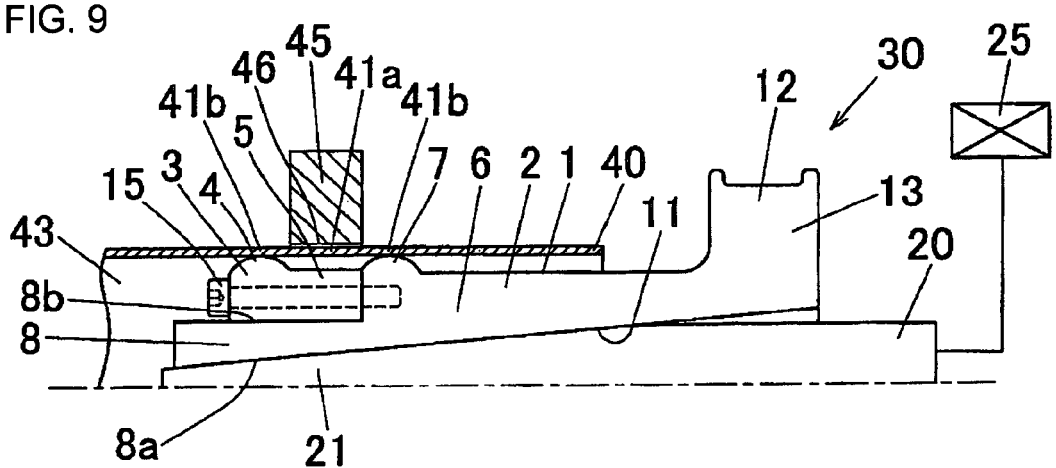
FIG. 9 is a half cross-sectional view showing a state before connecting a member-to-be-connected to a pipe with a connecting device according to a fourth embodiment of the present invention.

FIG. 9 is an explanatory view of a connecting device 30 of a fourth embodiment of the present invention. This connecting device 30 will be explained below, focusing on the points different from the first embodiment.

In this connecting device 30, the piece 3 is integrally provided with an extended portion 5 extended toward the die segment main body 6. This extended portion 5 is used to press the inserted portion 41a of the pipe 40 inserted in the insertion hole 46 radially outward of the pipe 40. In this fourth embodiment, it can be recognized such that the piece 3 is integrally formed with a spacer.

The other structure of this connecting device 30 and the connecting method using the connecting device 30 are the same as those of the first embodiment.

In the present invention, the length of the extended portion 5 of the piece 3 can be changed variously depending on the thickness of the member-to-be-connected 45. Furthermore, in the present invention, the extended portion 5 can be integrally formed not with the piece 3 but with the die segment main body 6.

Fifth Embodiment

Figure 10:
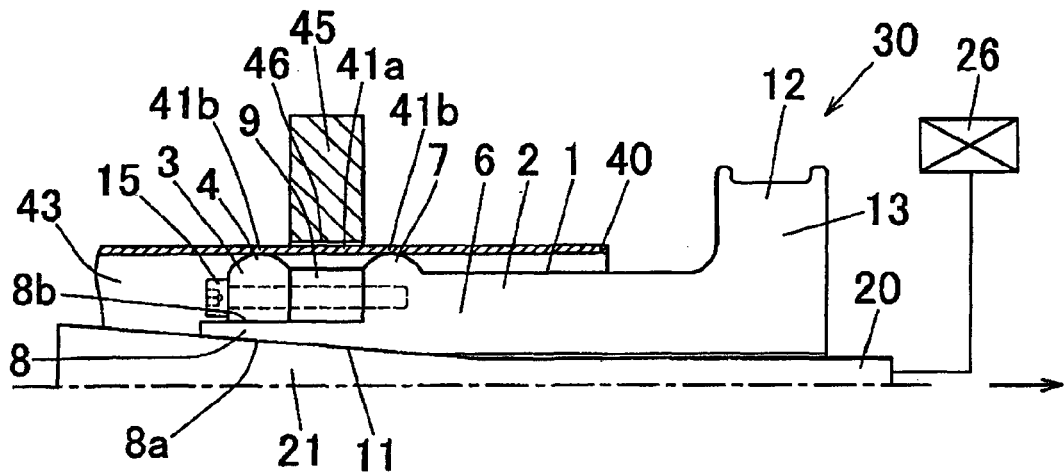
FIG. 10 is a half cross-sectional view showing a state before connecting a member-to-be-connected to a pipe with a connecting device according to a fifth embodiment of the present invention.

FIG. 10 is an explanatory view of a connecting device 30 a fifth embodiment of the present invention. This connecting device 30 will be explained below, focusing on the points different from the first embodiment.

This connecting device 30 is equipped with a pulling means 26, not a pushing means 25. This pulling means 26 is configured to pull the mandrel 20 in the direction of inserting the wedge portion 21 of the mandrel 20 into the wedge hole portion 11 of the die 1, and connected to the end portion of the mandrel 20 opposite to the wedge portion 21. For example, a hydraulic cylinder is used as the pulling means 26.

In connecting the member-to-be-connected 45 to the pipe 40 using the connecting device 30, the mandrel 20 is pulled in the axial direction thereof with the pulling means to thereby forcibly insert the wedge portion 21 of the mandrel 20 into the wedge hole portion 11 of the die 1. By this operation, each die segment 2 of the die 1 is moved radially outward to expand the expansion target portion 41. As a result, the member-to-be-connected 45 is connected to the pipe 40.

This connecting device 30 can prevent buckling of the mandrel 20.

In the present invention, the connecting device 30 can be provided with both the pressing means 25 and the pulling means 26. In this case, the buckling of the mandrel 20 can be prevented, and that the tensile breakage of the mandrel 20 can also be prevented.

Sixth Embodiment

Figure 11:
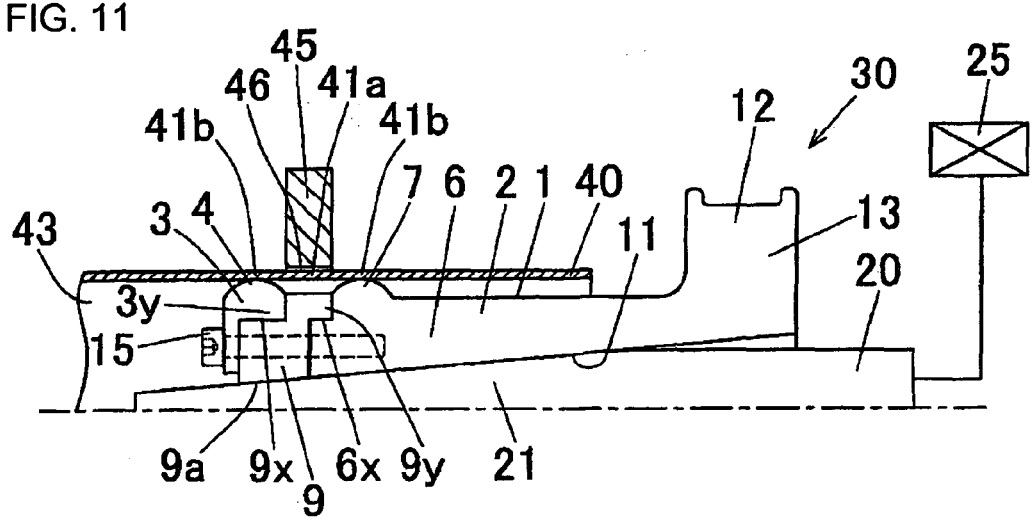
FIG. 11 is a half cross-sectional view showing a state before connecting a member-to-be-connected to a pipe with a connecting device according to a sixth embodiment of the present invention.
Figure 12:
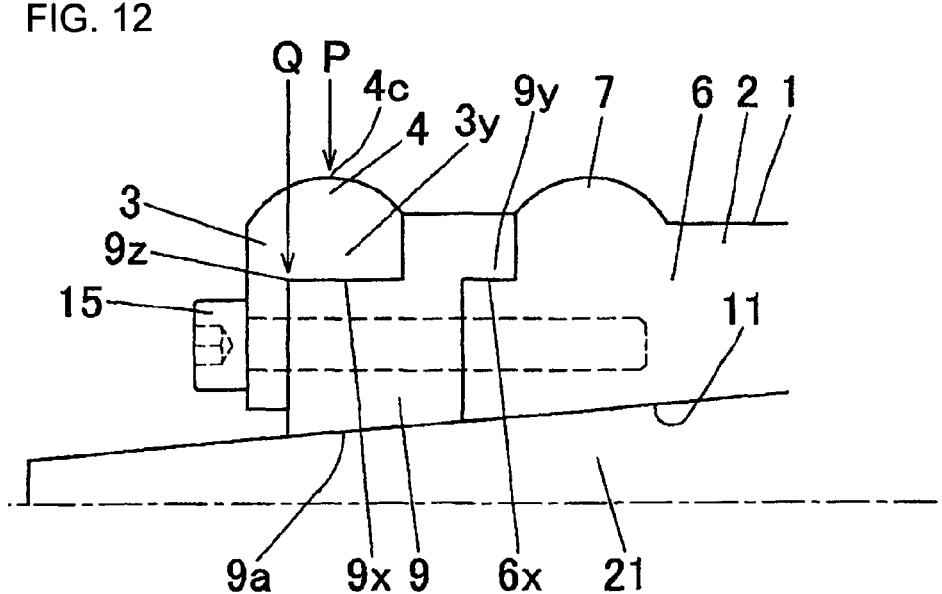
FIG. 12 is an enlarged view showing a principal portion of the connecting device.

FIGS. 11 and 12 each are an explanatory view of a connecting device 30 of a sixth embodiment of the present invention. This connecting device 30 will be explained below, focusing on the points different from the first embodiment.

In this connecting device 30, the die segment main body 6 has no extended portion (see "8" in FIG. 5). The piece 3, the die segment main body 6, and the spacer 9 are detachably connected with a connection bolt 15 with the spacer 9 disposed between the piece 3 and the die segment main body 6. More specifically, the piece 3, the spacer 9, and the die segment main body 6 are arranged in this order along the axial direction of the die 1 and detachably connected with the connection bolt 15.

Furthermore, the surface 9a of the spacer 9 located at the side of the wedge hole portion 11 is inclined at the same tapered angle as that of the inner peripheral surface of the wedge hole portion 11, and is flush with the inner peripheral surface of the wedge hollow portion 11. With this structure, this surface 9a is brought into contact with the mandrel 20 (more specifically the external peripheral surface of the wedge portion 21 of the mandrel 20) inserted in the wedge hole portion 11 at the time of the expansion work and receives a driving force in the radially outward direction of the pipe 40. On the other hand, the piece 3 will not come into contact with the wedge portion 21 of the mandrel 20 inserted in the wedge hole portion 11 at the time of the expansion work.

On the surface of the die segment main body 6 facing the spacer 9, an engaging stepped portion 6x is formed. Furthermore, on the surface of the spacer 9 facing the die segment main body 6, an engaging protruded portion 9y capable of being engaged with the engaging stepped portion 6x is integrally formed. In the state in which the engaging stepped portion 6x and the engaging protruded portion 9y are engaged in the radial direction of the die 1, the spacer 9 and the die segment main body 6 are detachably connected with the connection bolt 15. In the present invention, it can be configured such that the spacer 9 and the die segment main body 6 are detachably connected with the connection bolt 15 in a state in which the engaging stepped portion 6x and the engaging protruded portion 9y are engaged in the circumferential direction of the die 1.

On the surface of the spacer 9 facing the piece 3, an engaging stepped portion 9x is formed. Furthermore, on the surface of the piece 3 facing the spacer 9, an engaging protruded portion 3y capable of being engaged with the engaging stepped portion 9x is integrally formed. The piece 3 and the spacer 9 are detachably connected with the connection bolt 15 with the engaging stepped portion 9x and the engaging protruded portion 3y engaged in the radial direction of the die 1. In the present invention, it can be configured such that the piece 3 and the spacer 9 are detachably connected with the connection bolt 15 in a state in which the engaging stepped portion 9x and the engaging protruded portion 3y are engaged in the circumferential direction of the die 1.

Furthermore, as shown in FIG. 12, the engaging stepped portion 9x of the spacer 9 and the engaging protruded portion 3y of the piece 3 are formed so that the position Q of the tip end 9z of the engaging stepped portion 9x of the spacer 9 is positioned at the same position as the position P of the apex 4c of the first pressing protruded portion 4 of the piece 3 in the axial direction of the die 1 or at the position opposite to the spacer 9 with respect to the apex 4c in a state in which the engaging stepped portion 9x of the spacer 9 and the engaging protruded portion 3y are engaged each other. This enables assured application of the driving force to the first pressing protruded portion 4 of the piece 3 from the spacer 9 in the radially outward direction of the pipe 40, and also enables the engaging stepped portion 9x of the spacer 9 to assuredly receive the load applied to the first pressing protruded portion 4 of the piece 3 from the pipe 40 at the time of the expansion work.

The connecting device 30 has the following advantages.

As explained above, the surface 9a of the spacer 9 located at the side of the wedge hole portion 11 comes into contact with the wedge portion 21 of the mandrel 20 inserted in the wedge hole portion 11 at the time of the expansion work. As a result, the surface 9a of the spacer 9 located at the side of the wedge hole portion 11 receives a driving force in the radially outward direction of the pipe 40 at the time of the expansion work. This enables assured application of the driving force to the spacer 9 in the radially outward direction of the pipe 40.

Furthermore, the engaging stepped portion 6x and the engaging protruded portion 9y, which are engageable with each other, are provided at the opposing faces of the die segment main body 6 and the spacer 9, which allows easy positioning of the spacer 9 with respect to the die segment main body 6.

Furthermore, the engaging stepped portion 9x and the engaging protruded portion 3y, which are engageable with each other, are provided at the opposing faces of the spacer 9 and the piece 3, which allows easy positioning of the piece 3 with respect to the spacer 9.

Furthermore, this connecting device 30 has the following advantages superior to those of the connecting devices according to the first to fifth embodiments.

In the connecting devices 30 of the first to fifth embodiments, as shown in FIG. 5, since a large load will be applied to the extended portion 8 of the die segment main body 6 of the die 1 at the time of the expansion work, the thickness H of the extended portion 8 is preferably as thicker as possible. However, if the thickness H of the extended portion 8 is increased, it is required to decrease the thickness of the piece 3 and that of the spacer 9, which may cause difficulty of securing a necessary connection area (e.g., bolt insertion hole 16, threaded hole 17) required to connect the piece 3, the spacer 9, and the die segment main body 6 with the connection bolt 15. Furthermore, this may cause the head portion of the connection bolt 15 to be brought into contact with the inner peripheral surface of the pipe 40 at the time of the expansion work.

To the contrary, as shown in FIGS. 11 and 12, in this connecting device 30, the surface 9a of the spacer 9 located at the side of the wedge hole portion 11 comes into contact with the wedge portion 21 of the mandrel 20 inserted in the wedge hole portion 11 at the time of the expansion work, allowing the spacer 9 to increase the thickness, which in turn enables assured receiving of the load applied to the piece 3 and the spacer 9 at the time of the expansion work. Furthermore, the piece 3, the spacer 9, and the die segment main body 6 are arranged sequentially in the axial direction and connected with the connection bolt 15, which allows easy securing of a connection area required to connect these members with the connection bolt 15.

Seventh Embodiment

Figure 13:
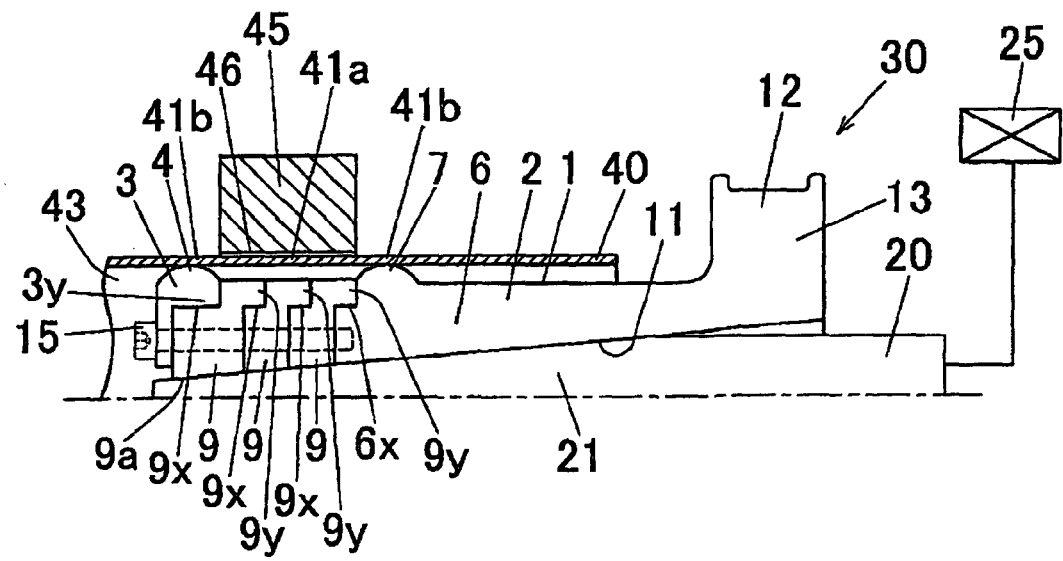
FIG. 13 is a half cross-sectional view showing a state before connecting a member-to-be-connected to a pipe with a connecting device according to a seventh embodiment of the present invention.

FIG. 13 is an explanatory view of a connecting device 30 of a seventh embodiment of the present invention. This connecting device 30 will be explained below, focusing on the points different from the sixth embodiment.

In this seventh embodiment, the thickness of the member-to-be-connected 45 is thicker than that of the member-to-be-connected of the aforementioned sixth embodiment. In this connecting device 30, a plurality of spacers 9 selected from a plurality of spacers so as to correspond to the thickness of the member-to-be-connected 45 are arranged and combined in the axial direction of the die 1. In this seventh embodiment, the number of spacers 9 is three.

In these three spacers 9, 9, and 9, on the opposing surfaces of the two adjacent spacers 9 and 9, an engaging stepped portion 9x and an engaging protruded portion 9y, which are engageable with each other, are formed. Both the spacers 9 and 9 are detachably connected with a connection bolt 15 with the engaging stepped portion 9x and the engaging protruded portion 9y engaged in the radial direction.

In this connecting device 30, the engaging stepped portion 9x and the engaging protruded portion 9y, which are mutually engageable, are formed on the opposing surfaces of both the spacers 9 and 9, enabling easy positioning of one of the spacers 9 with respect to the other spacer 9.

The other structure of this connecting device 30 is the same as that of the connecting device of the aforementioned sixth embodiment. Furthermore, the connecting method using this connecting device 30 is the same as that of the first embodiment.

In the present invention, the number of spacers 9 disposed between the piece 3 and the die segment main body 6 is not limited to three, and can be variously decided depending on the thickness of the member-to-be-connected 45, for example, two, or four or more. Furthermore, in the present invention, the plurality of spacers 9 can have the same or different shape.

Eighth Embodiment

Figure 14:
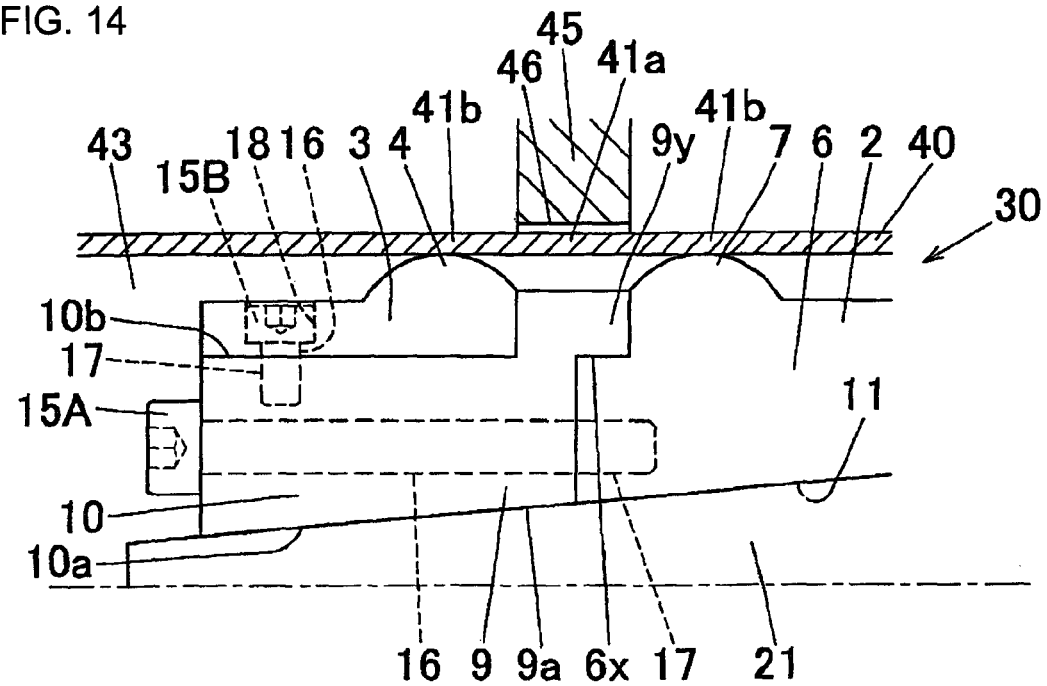
FIG. 14 is a half cross-sectional view showing a state before connecting a member-to-be-connected to a pipe with a connecting device according to an eighth embodiment of the present invention.

FIG. 14 is an explanatory view of a connecting device 30 of an eighth embodiment of the present invention. This connecting device 30 will be explained below, focusing on the points different from the sixth embodiment.

In this connecting device 3, an extended portion 10 extended toward the piece 3 is integrally provided with the spacer 9. The surface 10a of the extended portion 10 located at the side of the wedge hole portion 11 is inclined at the same tapered angle as that of the inner peripheral surface of the wedge hole portion 11, and is flush with the inner peripheral surface of the wedge hollow portion 11. With this structure, this surface 10a is brought into contact with the wedge portion 21 of the mandrel 20 (more specifically the external peripheral surface of the wedge portion 21) inserted in the wedge hole portion 11 at the time of the expansion work and receives a driving force in the radially outward direction of the pipe 40.

The piece 3 is disposed on the surface 10b of the extended portion 10 of the spacer 9 located at the opposite side of the wedge hole portion 11, and will not come into contact with the wedge portion 21 of the mandrel 20 inserted in the wedge hole 11 at the time of the expansion work.

The spacer 9 has a bolt insertion hole 16 for inserting a first connection bolt 15A as a connection means so as to penetrate the spacer 9 in the longitudinal direction of the spacer 9 and the extended portion 10. Furthermore, in the surface of the die segment main body 61 opposed to the spacer 9, a threaded hole 17 to be threaded with the first connection bolt 15A is formed.

The piece 3 has an dented portion 18 for accommodating the head portion of a second connection bolt 15B as a connection means and a bolt insertion hole 16 penetrating from the bottom portion of the dented portion 18 in the thickness direction of the piece 3. A threaded hole 17 to be threaded with the second connection bolt 15B is formed in the surface of the extended portion 10 of the spacer 9 opposing the piece 3.

In this die segment 2, in a state in which the engaging stepped portion 6x of the die segment main body 6 and the engaging protruded portion 9y of the spacer 9 are engaged with each other in the radial direction of the die 1, the first connection bolt 15A is inserted in the bolt insertion hole 16 of the spacer 9, and the tip end portion of the first connection bolt 15A is engaged with the threaded hole 17 of the die segment main body 6. Thus, the spacer 9 and the die segment main body 6 are detachably connected with the first connection bolt 15A. Furthermore, in a state in which the piece 3 is disposed on the surface 10b of the extended portion 10 of the spacer 9 opposite to the wedge hole portion 11, the second connection bolt 15B is inserted in the bolt insertion hole 16 of the piece 3, and the tip end portion of the second connection bolt 15B is threaded with the threaded hole 17 of the spacer 9. Thus, the piece 3 and the spacer 9 are detachably connected with the second connection bolt 15B. In this state, the head portion of the second connection bolt 15B is accommodated in the dented portion 18 of the piece 3.

The other structure of this connecting device 30 is the same as that of the connecting device of the aforementioned sixth embodiment. Furthermore, the connecting method using this connecting device 30 is the same as that of the first embodiment.

In this connecting device 30, as explained above, the spacer 9 is integrally provided with an extended portion 10 extended toward the piece 3, and the surface 10a of the extended portion 10 of the spacer 9 located at the side of the wedge hole portion 11 comes into contact with the wedge portion 21 of the mandrel 20 inserted in the wedge hole portion 11 at the time of the expansion work. Therefore, the surface 10a of the extended portion 10 of the spacer 9 located at the side of the wedge hole portion 11 receives a driving force from the wedge portion 21 of the mandrel 20 in the radially outward direction at the time of the expansion work. The piece 3 is disposed on the surface 10b of the extended portion 10 located at the opposite side of the wedge hole portion 11, which enables assured application of a driving force in the radially outward direction of the pipe 40 to the first pressing protruded portion 4 of the piece 3. Therefore, the predetermined portions 41b of the pipe 40 can be assuredly expanded.

In the present invention, the number of connection bolts (or the number of connecting portions) for connecting the piece 3, the spacer 9 and the die segment main body 6 is not limited one (or one portion) as in the first embodiment, or two (or two portions) as in the eighth embodiment, and can be, for example, three (or three portions), or four (or four portions) or more.

Ninth Embodiment

Figure 15:
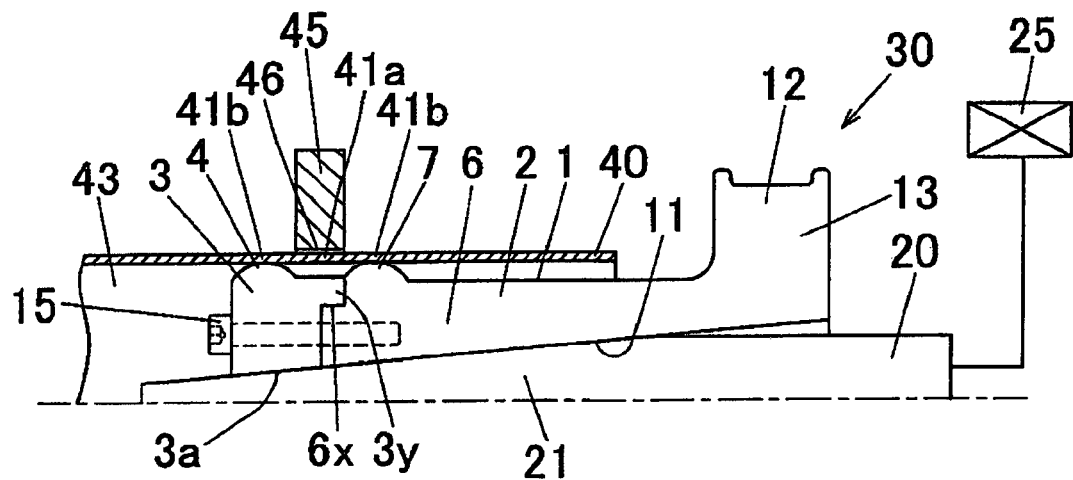
FIG. 15 is a half cross-sectional view showing a state before connecting a member-to-be-connected to a pipe with a connecting device according to a ninth embodiment of the present invention.

FIG. 15 is an explanatory view of a connecting device 30 of a ninth embodiment of the present invention. This connecting device 30 will be explained below, focusing on the points different from the sixth embodiment.

In this connecting device 30, no spacer is used. The surface 3a of the piece 3 located at the side of the wedge hole portion 11 is inclined at the same tapered angle as that of the inner peripheral surface of the wedge hole portion 11, and is flush with the inner peripheral surface of the wedge hole portion 11. Thus, the surface 3a comes into contact with the wedge portion 21 (more specifically the external peripheral surface of the wedge portion 21) of the mandrel 20 inserted in the wedge hole portion 11 and receives a driving force in the radially outward direction of the pipe 40 at the time of the expansion work.

On the surface of the die segment main body 6 opposing the piece 3, an engaging stepped portion 6x is formed. Furthermore, on the surface of the piece 3 opposing the die segment main body 6, an engaging protruded portion 3y which is engageable with the engaging stepped portion 6x is integrally formed. The piece 3 and the die segment main body 6 are directly connected with a connection bolt 15 in a detachable manner in a state in which the engaging stepped portion 6x and the engaging protruded portion 3y are engaged with each other in the radial direction of the die 1.

The other structure of this connecting device 30 is the same as that of the connecting device of the aforementioned sixth embodiment. Furthermore, the connecting method using this connecting device 30 is the same as that of the first embodiment.

In this connecting device 30, as explained above, the surface 3a of the piece 3 located at the side of the wedge hole portion 11 comes into contact with the wedge portion 21 of the mandrel 20 inserted in the wedge hole portion 11 at the time of the expansion work. Therefore, the surface 3a of the piece 3 at the side of the wedge hole portion 11 receives a driving force from the wedge portion 21 of the mandrel 20 in the radially outward direction of the pipe 40 at the time of the expansion work. This allows assured application of the driving force from the wedge portion 21 of the mandrel 20 in the radially outward direction of the pipe 40 at the time of the expansion work, which in turn enables assured expansion work of the predetermined portions 41b of the pipe 40.

Furthermore, the engaging stepped portion 6x and the engaging protruded portion 3y, which are engageable with each other, are provided at the opposing surfaces of the die segment main body 6 and the piece 3. This allows easy positioning of the piece 3 with respect to the die segment main body 6.

Tenth Embodiment

Figure 16:
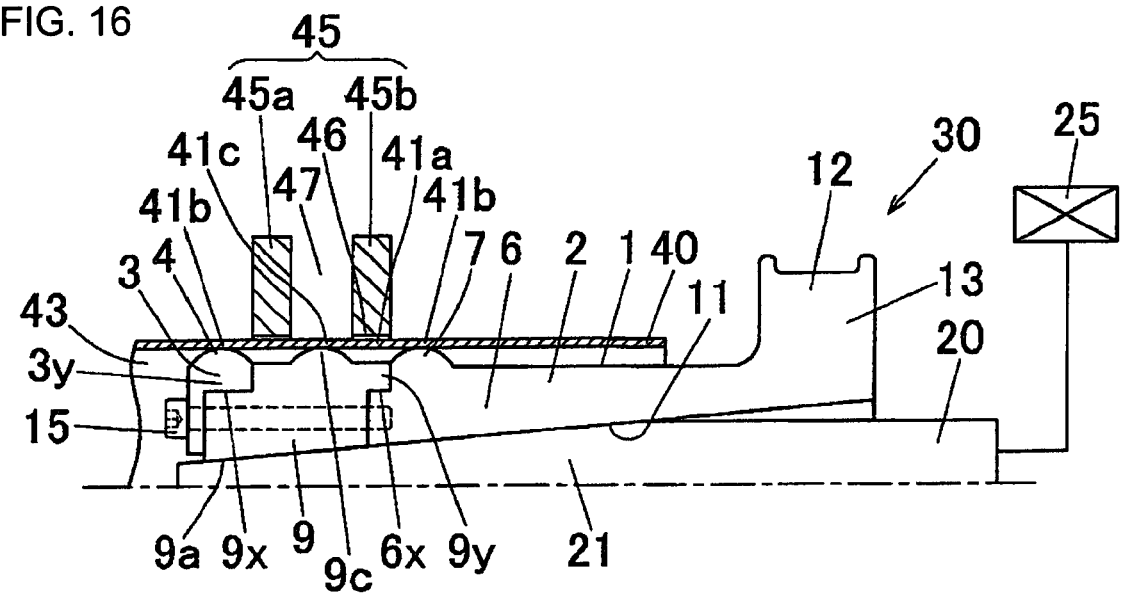
FIG. 16 is a half cross-sectional view showing a state before connecting a member-to-be-connected to a pipe with a connecting device according to a tenth embodiment of the present invention.

FIG. 16 is an explanatory view of a connecting device 30 of a tenth embodiment of the present invention. This connecting device 30 will be explained below, focusing on the points different from the sixth embodiment.

In this tenth embodiment, the member-to-be-connected 45 is divided into two pieces, a first member-to-be-connected 45a and a second member-to-be-connected 45b, in the thickness direction. The first member-to-be-connected 45a and the second member-to-be-connected 45b are disposed at a distance in the axial direction of the pipe 40 with the pipe 40 inserted in the insertion hole 46.

In this connecting device 30, the spacer 9 is set to be longer in length than the spacer of the aforementioned sixth embodiment. Furthermore, a third pressing protruded portion 9c is formed on the external peripheral surface of the spacer 9 (i.e., the external surface of the spacer 9 facing the pipe 40). This third pressing protruded portion 9c presses locally outward of the pipe 40 the portion 41c of the pipe 40 corresponding to the gap 47 between the first member-to-be-connected 45a and the second member-to-be-connected 45b to plastically deform the portion 41c, to thereby form a diameter enlarged portion (protruded portion) having an arc cross-section at the portion 41c. The third pressing protruded portion 9c extends in the circumferential direction of the die 1 and protrudes in an arc shape in cross-section.

The other structure of this connecting device 30 is the same as that of the connecting device of the aforementioned sixth embodiment. Furthermore, the connecting method using this connecting device 30 is the same as that of the first embodiment.

In this connecting device 30, the third pressing protruded portion 41c is formed on the external peripheral surface of the spacer 9. Therefore, when collectively connecting the first member-to-be-connected 45a and the second member-to-be-connected 45b to the pipe 40, the portion 41c of the pipe 40 corresponding to the gap 47 between the first member-to-be-connected 45a and the second member-to-be-connected 45b can be subjected to the expansion work to thereby locally form a diameter enlarged portion arc in cross-section at the portion 41c.

Although several embodiments of the present invention were explained above, the present invention is not limited to the aforementioned embodiments.

For example, in the first embodiment, the dividing number of the die 1 is eight. In the present invention, however, the dividing number of the die 1 is not limited to eight, and can be variously changed. Other than the above, the number can be, for example, four or six, or an even number, or an odd number.

Furthermore, in the present invention, the connection means is not limited to the connection bolt 15, and can be any other means.

Furthermore, the pipe 40 is not limited to a pipe circular in cross-section, and can be a polygonal shape in cross-section, such as, a square shape in cross-section or a hexagonal shape in cross-section. Furthermore, the pipe 40 can be a pipe having a partition wall (not illustrated) formed in the hollow portion 43 of the pipe 40 and extending in the axial direction of the pipe 40.

Furthermore, in the present invention, the connecting device can be constituted by combining two or more technical concepts applied to the first to tenth embodiments.

This application claims priority to Japanese Patent Application No. 2007-24695 filed on Sep. 25, 2007, and the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

INDUSTRIAL APPLICABILITY

The present invention can be applied to a connecting device for connecting a member-to-be-connected such as a flange to a pipe and to a connecting method using the connecting device.

The invention claimed is:

1. A connecting device for connecting a member-to-be-connected to a pipe by expanding both adjacent portions of the pipe axially adjacent to an inserted portion of the pipe inserted in an insertion hole formed in the member-to-be-connected in a state in which the pipe is inserted in the insertion hole, comprising:
   a die to be disposed in a hollow portion of the pipe and divided into a plurality of die segments centering around a wedge hole portion in a circumferential direction; and
   a mandrel to be inserted in the wedge hole portion of the die to move each die segment of the die in a radially outward direction of the pipe,
   wherein the die segment comprises a piece having a first pressing protruded portion which presses one of both the adjacent portions of the pipe, a die segment main body having a second pressing protruded portion which presses the other adjacent portion and comes in contact with the mandrel, and connection means which detachably connects the piece and the die segment main body,
   wherein the die segment main body is integrally provided with an extended portion extended toward the piece,
   wherein a surface of the extended portion located at a side of the wedge hole portion comes into contact with the mandrel, and
   wherein the piece is disposed on a surface of the extended portion opposite to the wedge hole portion.

2. A connecting method for connecting a pipe and a member-to-be-connected using a connecting device comprising a die divided into a plurality of die segments centering around a wedge portion in a circumferential direction, and a mandrel, wherein the mandrel is inserted in the wedge hole portion of the die arranged in a hollow portion of the pipe to expand both axially adjacent portions of the pipe adjacent to an inserted portion of the pipe inserted in an insertion hole formed in the member-to-be-connected, to thereby connect the member-to-be-connected to the pipe, wherein the connecting device as recited in claim 1 is used as the connecting device.

3. The connecting device as recited in claim 1, wherein an engaging stepped portion and an engaging protruded portion, which are engageable with each other, are formed on opposing surfaces of the die segment main body and the piece.

4. A connecting device for connecting a member-to-be-connected to a pipe by expanding both adjacent portions of the pipe axially adjacent to an inserted portion of the pipe inserted in an insertion hole formed in the member-to-be-connected in a state in which the pipe is inserted in the insertion hole, comprising:

a die to be disposed in a hollow portion of the pipe and divided into a plurality of die segments centering around a wedge hole portion in a circumferential direction; and a mandrel to be inserted in the wedge hole portion of the die to move each die segment of the die in a radially outward direction of the pipe, wherein the die segment comprises a piece having a first pressing protruded portion which presses one of both the adjacent portions of the pipe, a die segment main body having a second pressing protruded portion which presses the other adjacent portion and comes in contact with the mandrel, and connection means which detachably connects the piece and the die segment main body, wherein a surface of the piece located at a side of the wedge hole portion comes into contact with the mandrel.

5. The connecting device as recited in claim 4, wherein an engaging stepped portion and an engaging protruded portion, which are engageable with each other, are formed on opposing surfaces of the die segment main body and the piece.

6. A connecting device for connecting a member-to-be-connected to a pipe by expanding both adjacent portions of the pipe axially adjacent to an inserted portion of the pipe inserted in an insertion hole formed in the member-to-be-connected in a state in which the pipe is inserted in the insertion hole, comprising:

a die to be disposed in a hollow portion of the pipe and divided into a plurality of die segments centering around a wedge hole portion in a circumferential direction; and a mandrel to be inserted in the wedge hole portion of the die to move each die segment of the die in a radially outward direction of the pipe, wherein the die segment comprises a piece having a first pressing protruded portion which presses one of both the adjacent portions of the pipe, a die segment main body having a second pressing protruded portion which presses the other adjacent portion and comes in contact with the mandrel, and connection means which detachably connects the piece and the die segment main body, wherein an engaging stepped portion and an engaging protruded portion, which are engageable with each other, are formed on opposing surfaces of the die segment main body and the piece.

7. A connecting device for connecting a member-to-be-connected to a pipe by expanding both adjacent portions of the pipe axially adjacent to an inserted portion of the pipe inserted in an insertion hole formed in the member-to-be-connected in a state in which the pipe is inserted in the insertion hole, comprising:

a die to be disposed in a hollow portion of the pipe and divided into a plurality of die segments centering around a wedge hole portion in a circumferential direction; and a mandrel to be inserted in the wedge hole portion of the die to move each die segment of the die in a radially outward direction of the pipe, wherein the die segment comprises a piece having a first pressing protruded portion which presses one of both the adjacent portions of the pipe, a die segment main body having a second pressing protruded portion which presses the other adjacent portion and comes in contact with the mandrel, and connection means which detachably connects the piece and the die segment main body, wherein the die segment is further equipped with at least one spacer disposed between the piece and the die segment main body, and wherein the connection means detachably connects the piece and the die segment main body via the spacer.

8. The connecting device as recited in claim 7, wherein the die segment main body is integrally provided with an extended portion extended toward the piece, wherein a surface of the extended portion located at a side of the wedge hole portion comes into contact with the mandrel, and wherein the piece and the spacer are disposed on a surface of the extended portion opposite to the wedge hole portion.

9. The connecting device as recited in claim 7, wherein a surface of the spacer located at the side of the wedge hole portion comes into contact with the mandrel.

10. The connecting device as recited in claim 9, wherein an engaging stepped portion and an engaging protruded portion, which are engageable with each other, are formed on opposing surfaces of the die segment main body and the spacer.

11. The connecting device as recited in claim 10, wherein an engaging stepped portion and an engaging protruded portion, which are engageable with each other, are formed on opposing surfaces of the spacer and the piece.

12. The connecting device as recited in claim 11, wherein the engaging stepped portion and the engaging protruded portion are formed such that, in a state in which the engaging stepped portion and the engaging protruded portion are engaged with each other, a position of a tip end of the engaging stepped portion is located at the same position as an apex portion of the first pressing protruded portion of the piece in an axial direction of the die, or is located at a position opposite to the spacer with respect to the apex portion.

13. The connecting device as recited in claim 9, wherein an engaging stepped portion and an engaging protruded portion, which are engageable with each other, are formed on opposing surfaces of the spacer and the piece.

14. The connecting device as recited in claim 13, wherein the engaging stepped portion and the engaging protruded portion are formed such that, in a state in which the engaging stepped portion and the engaging protruded portion are engaged with each other, a position of a tip end of the engaging stepped portion is located at the same position as an apex portion of the first pressing protruded portion of the piece in an axial direction of the die, or is located at a position opposite to the spacer with respect to the apex portion.

15. The connecting device as recited in claims 9, wherein the spacer is integrally provided with an extended portion extended toward the piece, wherein a surface of the extended portion located at a side of the wedge hole portion comes into contact with the mandrel, and wherein the piece is disposed on a surface of the extended portion opposite to the wedge hole portion.

16. The connecting device as recited in claim 7, wherein the member-to-be-connected includes a first member-to-be-connected and a second member-to-be-connected to be disposed with a distance in an axial direction of the pipe with the pipe inserted in the insertion hole of the member-to-be-connected, and wherein the spacer has a third pressing protruded portion which presses a portion of the pipe corresponding to a gap between the first member-to-be-connected and the second members-to-be-connected.

\* \* \* \* \*